(12) United States Patent
Gu et al.

(10) Patent No.: US 8,480,787 B2
(45) Date of Patent: Jul. 9, 2013

(54) ULTRASOUND-ASSISTED ELECTROSPRAY IONIC LIQUID FOR CARBON DIOXIDE CAPTURE

(75) Inventors: Alex Gu, Plymouth, MN (US); Adam Dewey McBrady, Minneapolis, MN (US); Wei Yang, Minnetonka, MN (US); Tariq Samad, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 361 days.

(21) Appl. No.: 12/841,746

(22) Filed: Jul. 22, 2010

(65) Prior Publication Data

US 2012/0017759 A1 Jan. 26, 2012

(51) Int. Cl.
*B03C 3/014* (2006.01)

(52) U.S. Cl.
USPC .............. 95/29; 95/64; 95/71; 95/236; 96/27; 96/53; 96/74; 96/389; 261/81

(58) Field of Classification Search
USPC .................. 95/29, 64–67, 71, 236; 96/27, 52, 96/53, 74, 389; 261/81, 117, 118
See application file for complete search history.

(56) References Cited

U.S. PATENT DOCUMENTS

| | | | | |
|---|---|---|---|---|
| 5,893,943 A * | 4/1999 | Durham et al. | | 95/65 |
| 6,579,343 B2 * | 6/2003 | Brennecke et al. | | 95/51 |
| 6,656,253 B2 * | 12/2003 | Willey et al. | | 96/27 |
| 8,287,627 B2 * | 10/2012 | Chung et al. | | 95/236 |
| 2006/0185511 A1 * | 8/2006 | Tepper | | 95/71 |
| 2008/0121106 A1 * | 5/2008 | Tepper et al. | | 96/27 |
| 2008/0138265 A1 * | 6/2008 | Lackner et al. | | 423/224 |
| 2008/0148939 A1 * | 6/2008 | Fradette et al. | | 95/236 |
| 2008/0236390 A1 * | 10/2008 | Anders et al. | | 95/183 |
| 2009/0114090 A1 * | 5/2009 | Gu et al. | | 95/66 |
| 2009/0148930 A1 * | 6/2009 | Gal et al. | | 435/264 |
| 2009/0158930 A1 * | 6/2009 | Wagner et al. | | 95/179 |
| 2009/0199713 A1 * | 8/2009 | Asprion et al. | | 95/236 |
| 2009/0235817 A1 * | 9/2009 | Gu et al. | | 95/79 |
| 2009/0291874 A1 * | 11/2009 | Bara et al. | | 510/175 |
| 2009/0320682 A1 * | 12/2009 | Wagner et al. | | 95/172 |
| 2010/0132556 A1 * | 6/2010 | Constantz et al. | | 95/234 |
| 2010/0224063 A1 * | 9/2010 | Choi et al. | | 95/236 |
| 2011/0000369 A1 * | 1/2011 | Tollens | | 95/62 |

FOREIGN PATENT DOCUMENTS

JP 60-78616 A * 5/1985 ...................... 95/236

* cited by examiner

*Primary Examiner* — Richard L Chiesa (74) *Attorney, Agent, or Firm* — Schwegman, Lundberg & Woessner, P.A.

(57) ABSTRACT

A system includes an ultrasound wave generator, a fluid cavity coupled to the ultrasound wave generator, an array of micro-machined ultrasonic-assisted electrospray nozzles coupled to the fluid cavity, an electrode configured to impart a charge onto the fluid output of the electrospray nozzles, and a carbon dioxide release unit configured to receive the ionic liquid after absorption of carbon dioxide by the ionic liquid and to remove carbon dioxide from the ionic liquid such that the regenerated ionic liquid can be recycled for additional carbon dioxide capture.

11 Claims, 8 Drawing Sheets

| IL PROPERTY | VALUE |
|---|---|
| VAPOR PRESSURE (Torr) | ~$10^{-12}$ |
| DECOMPOSITION TEMPERATURE (°C) | >200 |
| VISCOSITY AT 25°C (mPa's) | 78 |
| SURFACE TENSION (N/m) | 0.035 |
| GAS DIFFUSION CONSTANT (cm$^2$/sec) | $10^{-6}$ |
| MOLECULAR WEIGHT (g/mol) | 450 |
| THERMAL CONDUCTIVITY (W/mK) | 0.127 |
| HEAT CAPACITY (J/K/mol) | 583 |

ULTRASOUND-ASSISTED ELECTROSPRAY IONIC LIQUID FOR CARBON DIOXIDE CAPTURE

TECHNOLOGICAL FIELD

The present disclosure relates to the removal of carbon dioxide from an effluent, and in an embodiment, but not by way of limitation, the use of an ultrasound-assisted electrospray ionic liquid for carbon dioxide capture.

BACKGROUND

Global warming and climate change are closely correlated with carbon dioxide emissions from human activities. Flue gas emissions from power plants are especially implicated. Carbon dioxide capture promises to reduce power plant carbon dioxide emissions. However, techniques that reduce the capital and operational costs of conventional flue gas capture are needed.

For example, conventional capture technologies, including monoethanolamine (MEA) and Benfield, increase costs to a power plant by approximately 30%. Moreover, due to their low carbon dioxide capture efficiency and capacity, mass transfer limitations, energy requirements, and high upfront infrastructure investment, none of the technologies have been widely adopted.

DETAILED DESCRIPTION

The current disclosure relates to carbon capture (CC) technology that minimizes the overall increase in the cost of electricity (COE) from a coal power plant. The technology combines an Ultrasound-Assisted Electrospray (UAE) process with the desirable properties of novel Ionic Liquids (ILs). This UAEIL CC technology can be retrofitted into an existing power plant, or it can be installed in a new power plant as it is constructed. This technology can result in 0.4 mole of $CO_2$ capture per 1 mole of ionic liquid, resulting in dramatically less solvent being used than in traditional monoethanolamine (MEA) approaches. The lower solvent requirements can decrease carbon capture and sequestration (CCS) related capital expenditures. Parasitic power demands are minimized due to the low energies required for $CO_2$ desorption/IL regeneration and the low power required to spray the IL solvent. Based on these favorable characteristics, embodiments of this UAEIL CCS technology result in a COE increase of between 26 and 43% (versus an 81% increase for MEA CCS) relative to NON-CCS-equipped pulverized coal (PC) power plants.

An Ultrasound-Assisted Electrospray (UAE) process lowers the energy required to generate a high surface area plume of droplets of the IL. Ultrasound waves are focused and amplified within engineered fluidic chambers to generate mono-dispersed micrometer-diameter droplets with low power. Once in droplet form, localized electrodes can be used to charge the IL droplets to prevent subsequent coalescence and enable subsequent charged droplet collection using directed precipitation in an external electric field for solvent regeneration and re-use.

Ionic liquids are organic salts that are liquids at or near room temperature. ILs offer great tuning capability in their chemical and physical properties. Recent progress in IL design and synthesis has shown the solvents to be capable of high molar capacities of $CO_2$ while maintaining low interaction energies, and thus low $CO_2$ desorption energies. The physical characteristics of ILs offer both benefits and challenges for the UAEIL CCS system. The benefits arise from their very low vapor pressures. This physical characteristic prevents evaporative loss during $CO_2$ release, dramatically lowering the annual chemical costs associated with MEA CCS systems. However, the surface tensions and viscosities of the developed ILs must be taken into consideration in the design of the UAE unit to ensure that high surface area droplets in the plumes are created at low input energies.

Figure 1A:
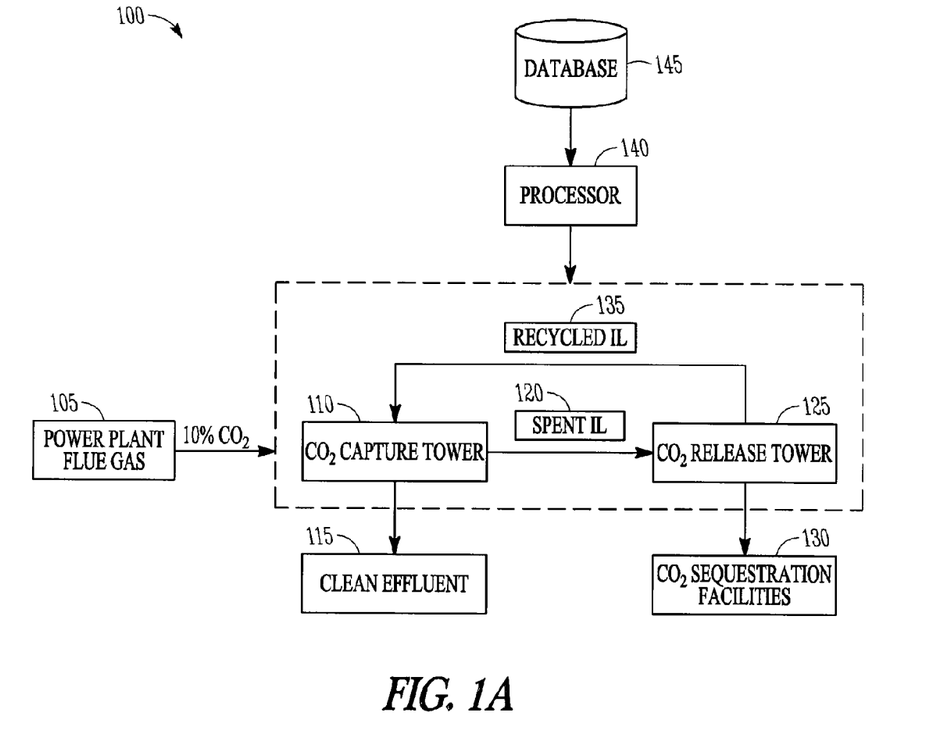
FIGS. 1A and 1B are diagrams of embodiments of an Ultrasound-Assisted Electrospray Ionic Liquid Carbon Capture and Sequestration (UAEIL CCS) system.
Figure 1B:
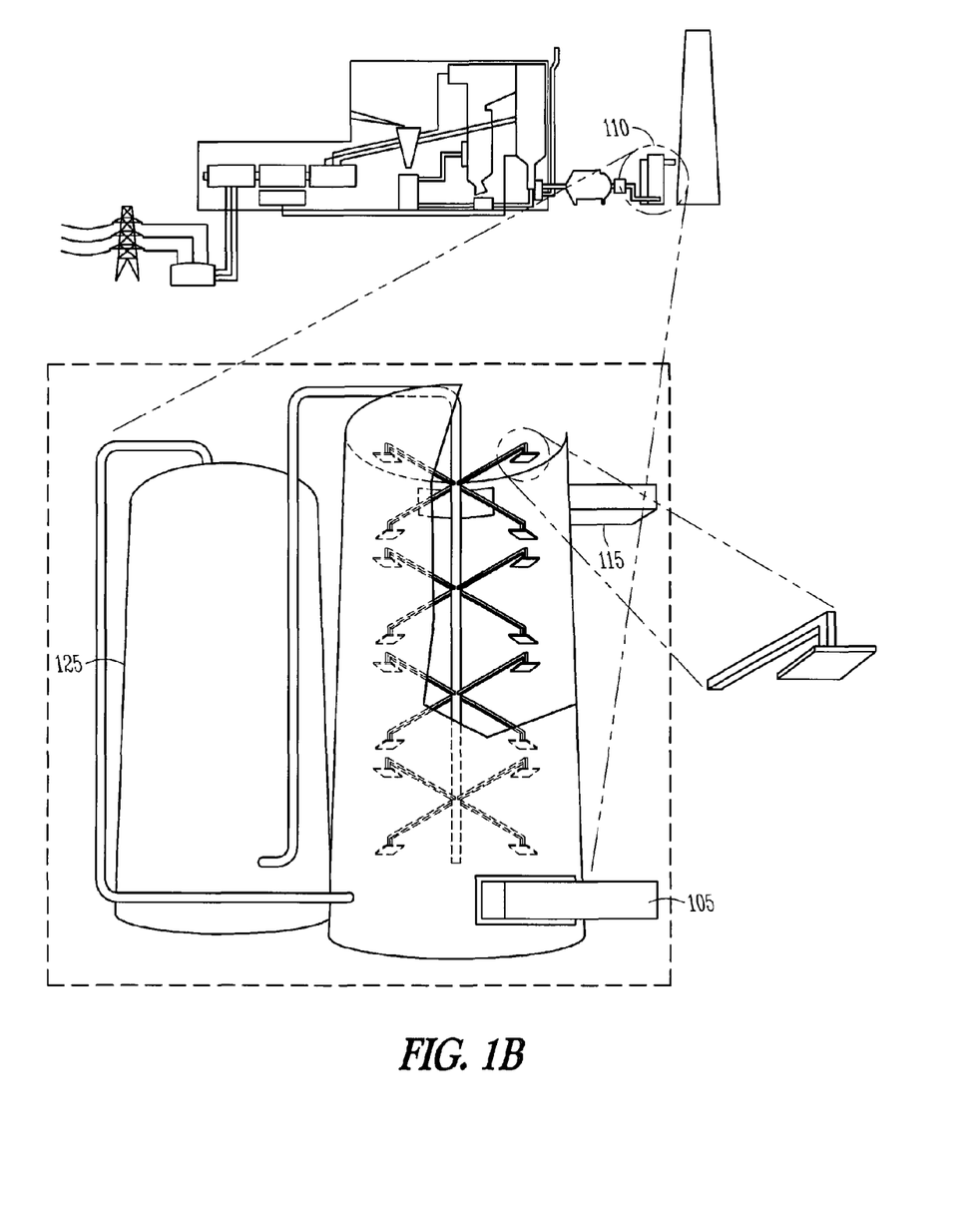

An embodiment of a UAEIL CCS system 100 is schematically illustrated in FIGS. 1A and 1B. Flue gas 105 enters the $CO_2$ capture tower 110 and it is allowed to interact with a high surface area plume of micron-sized charged ionic liquid (IL) droplets which are continuously generated by ultrasound-assisted electrospray (UAE). The $CO_2$ is effectively captured by the IL droplets and clean effluent 115 is released from the capture tower 110. Spent IL 120 with dissolved $CO_2$ is captured and pumped to a separate $CO_2$ release tower 125 for IL regeneration. Desorption temperatures are designed to be approximately 60° C. above the capture temperature. This temperature rise allows near complete release of the dissolved $CO_2$ from the spent IL. The released $CO_2$ is compressed and sequestered at 130 under similar conditions as those employed in the MEA process. The regenerated IL 135 is recycled back to the $CO_2$ capture tower for reuse. The system 100 can be controlled by a computer processor 140, which can be coupled to a database 145.

Two technologies in particular enable the performance of the CC system described herein. The first technology is the UAE nozzle. The UAE nozzles are responsible for generating the high surface area plume of droplets of the $CO_2$ absorbent. The UAE nozzles possess low power, high-throughput, and linearly scalable plume generation capabilities. (See FIG. 4). The second enabling technology is the $CO_2$ absorbent itself—the ionic liquids. (See FIG. 2). Such ILs have high $CO_2$ capture capacity, low viscosity, and desirable $CO_2$ absorption/desorption thermodynamics and kinetics. The following paragraphs of this disclosure address the innovations of both of these technologies as they apply to the field of CC.

In an embodiment, UAE fluid ejector arrays are arranged within a $CO_2$ capture tower. The ejector arrays can be positioned such that the droplet plumes spray downward, counter current or transverse to the direction of the flue gas. In an embodiment, the arrays of sprayers are based on an Array of Micromachined Ultra-Sonic Electrospray (AMUSE) nozzles. The AMUSE nozzles are a micro-electromechanical system (MEMS) enabled ultrasonic atomization technology useful for the manipulation of electro-active fluids. The micro-scale (3-50 μm) nozzles with incorporated electrodes for subsequent droplet charging possess several features that support UAEIL CC technology.

These nozzle features include controlled ejection of droplets of uniform diameter between 5 and 50 μm. These micron-sized droplets create a high surface area allowing for fast $CO_2$ capture kinetics (approximately 1 second versus 200 seconds for typical supported IL membranes (SILM)). The nozzles further permit high liquid throughput operation—e.g., 1.5 L/min with 400 nozzles on a 1 in$^2$ AMUSE device. In such a setup, approximately 40,000 such modules would be required for a 550 MW PC plant. The power input for this 1 in.$^2$ 400-nozzle AMUSE array is low, e.g. 85 mW for $H_2O$, approximately 5 W for IL, and there are diminishing extra power costs associated with adding nozzles to the array. A tunable droplet ejection velocity of 5-25 m/s can be controlled independently of the liquid flow rate. The nozzles further permit great flexibility in designing the gas-droplet contact configuration within the absorption tower. The nozzles possess the capability of spraying liquids with a wide variety of physical characteristics—e.g., conductive liquids (salt solutions), dielectric (FC-72) fluids, large viscosities (0.7-3000 mN-s/m$^2$) liquids, and liquids with various surface tensions (25-73 mN/m). The nozzles further provide greater flexibility to accommodate variations in synthesized ILs, or a larger framework for customized ILs. The nozzles have the capability to selectively charge droplets upon ejection. The charging prevents plume coalescence and enables electrostatic precipitation of the droplets to ensure negligible loss of the sprayed ILs. This capability reduces the annual chemical costs associated with MEA CCS systems and minimizes environmental effects. The nozzles permit rapid start-up and shut-down (~1 μsec) that is independent of device orientation relative to the gravity field. The nozzles further permit great flexibility in the design of the full-scale UAEIL CCS system and allow quick response to transient load demands. The ultrasound waves for droplet generation result in ultrasonic cleaning (anti-clogging) of the nozzles. This robustness relaxes the particulate requirements for the flue gas and could result in additional cost savings vis-à-vis parasitic power and capital equipment.

Figure 2:
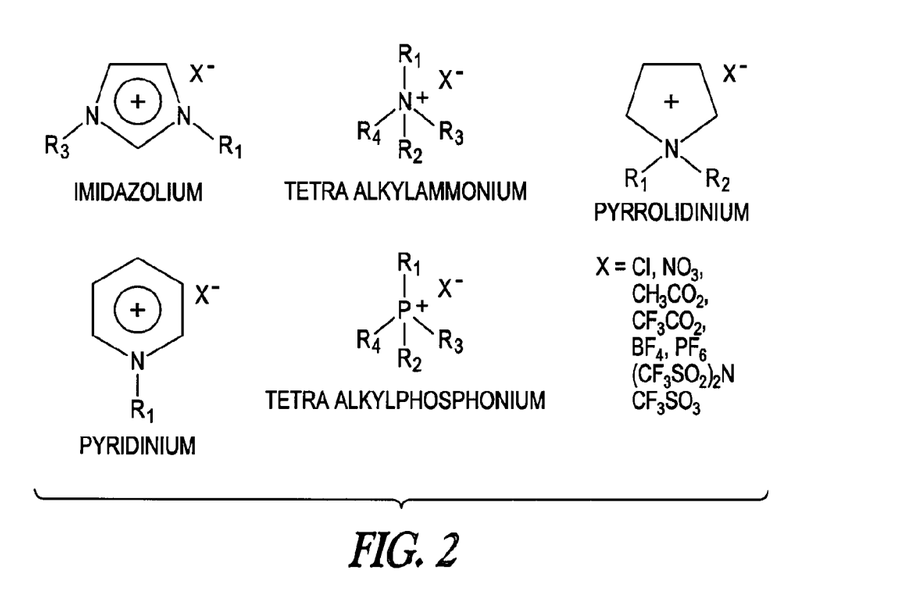
FIG. 2 illustrates example ionic liquid structures.

As noted, generating a high surface area liquid spray is a first part of the UAEIL CC technology. The second critical enabling technology is the customized IL. The ILs synthesized are designed to combine several ideal chemical and physical characteristics. These characteristics include high $CO_2$ capture capacity, low viscosity, rapid $CO_2$ kinetics, and favorable absorption/desorption thermodynamics. Examples of the chemical structure of typical IL cations and anions are shown in FIG. 2.

Additional attributes of ILs for the UAEIL CC technology include ultra-low vapor pressure, high thermal stability (e.g., −70° C. to 200° C.), higher viscosity (10 s to 1000 s mPas), low surface tension, low gas diffusion coefficient, desirable heat capacity, and high variation of the salvation properties.

Certain ionic liquids offer extremely desirable $CO_2$ absorption/desorption characteristics. And while ionic liquids are also good absorbents for $SO_x$ and $NO_x$, and although mentioned periodically in this disclosure, those characteristics are not a main focus of the embodiments of this disclosure. In certain embodiments, ILs repeatedly absorb 30% $CO_2$ (mol/mol) at 30° C. and 0.1 bar partial pressure and 10% (mol/mol) at 75° C. This equates to a 20% (mol/mol) $CO_2$ absorption/desorption capacity window between 30° C. and 75° C. That compares favorably to conventional MEA processes on a w/w basis, but requires significantly less energy for desorption from the IL. The lower desorption energy represents a significant parasitic power savings over traditional MEA CC technology. Similar results can be experienced with [$H_2C_3H_6MIM$][$Tf_2N$], which has an absorption enthalpy of −49 versus MEA's −143 kJ/mol. Once again, the lower energy will translate into lower parasitic power drains due to the regeneration of the scrubbing liquid and controlled release of the captured $CO_2$ for subsequent sequestration.

Figure 3:
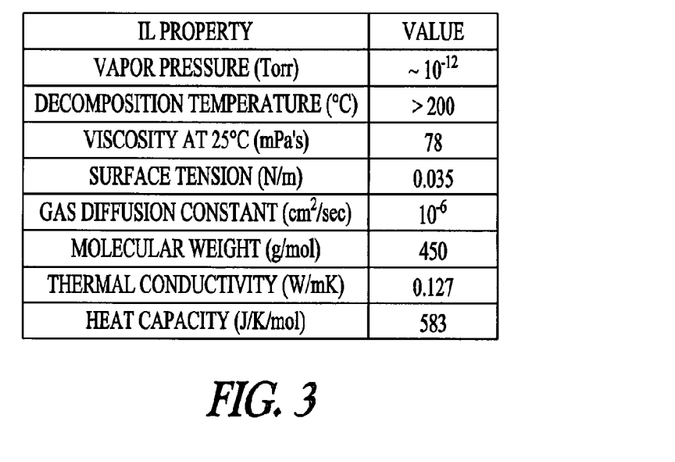
FIG. 3 illustrates properties of an Ultrasound-Assisted Electrospray Ionic Liquid.

There are several properties that are related to CC for selected traditional ILs, and customized ILs can expand these desirable properties. (See e.g., FIG. 3). An IL should possess a high $CO_2$ capacity and ideal spray characteristics, such as greater than 7% w/w $CO_2$ capture capacity at 25° C. with 0.1 bar $CO_2$ partial pressure, and low viscosity in the range of 1-100 cP under realistic operation conditions. The IL should be a reusable $CO_2$ absorbent with negligible evaporative and convective losses. The negligible losses will reduce annual chemical costs and enable low maintenance operation. The IL should possess up to a three-fold lower power $CO_2$ desorption compared with MEA approaches, that is, low $CO_2$ heat of absorption, preferably below 50 kJ/mol (3 times lower than MEA), and greater than 75% desorption of the captured CO2 at temperatures below 100° C. The IL should be highly robust to $SO_x$ and $NO_x$ contamination, and could eventually alleviate demands on upfront flue gas clean up prior to CCS.

One or more UAEIL embodiments integrate the technology of an array of massively parallel ultrasound-assisted electrospray (UAE) nozzles to disperse IL in micron sized droplets for high efficiency $CO_2$ capture from power plant flue gas. The following discusses the technical approach of the UAE sprayer and the approach of synthesizing ionic liquids.

The UAEIL CCS system relies on generating large volumes of micron-sized IL droplets within a $CO_2$ capture tower. The means of generation should involve low power consumption and be capable of spraying high volumes of viscous ILs. A typical MEA $CO_2$ absorption tower contains four columns. Each column is approximately 10 meters in diameter and 25 meters in height. For an efficient absorber to reach its maximum $CO_2$ absorption capacity, the driving capture kinetics should be on the order of one second. In an embodiment, 20 μm droplets combined with a nominal gas diffusion coefficient of $10^{-6}$ cm$^2$/sec in the IL provides the one second characteristic diffusion time. For comparison purposes, if one were to use a supported IL membrane (SILM) with a typical SILM thickness of 150 μm, a characteristic diffusion time of approximately 200 seconds would be the result. Therefore, with 20 micrometer droplets, one or more embodiments of the UAEIL CCS system will be able to rapidly reach the IL absorbent's $CO_2$ capacity.

Breaking viscous ILs into 20 μm droplets requires energy input (<0.2 MW for a 550 MW PC plant). The AMUSE platform is the lowest power, high surface area liquid dispersion approach known. So in an embodiment, the AMUSE platform can be modified to tailor it per UAEIL CC requirements. The following paragraphs address different aspects of the UAE unit in detail.

Figure 4:
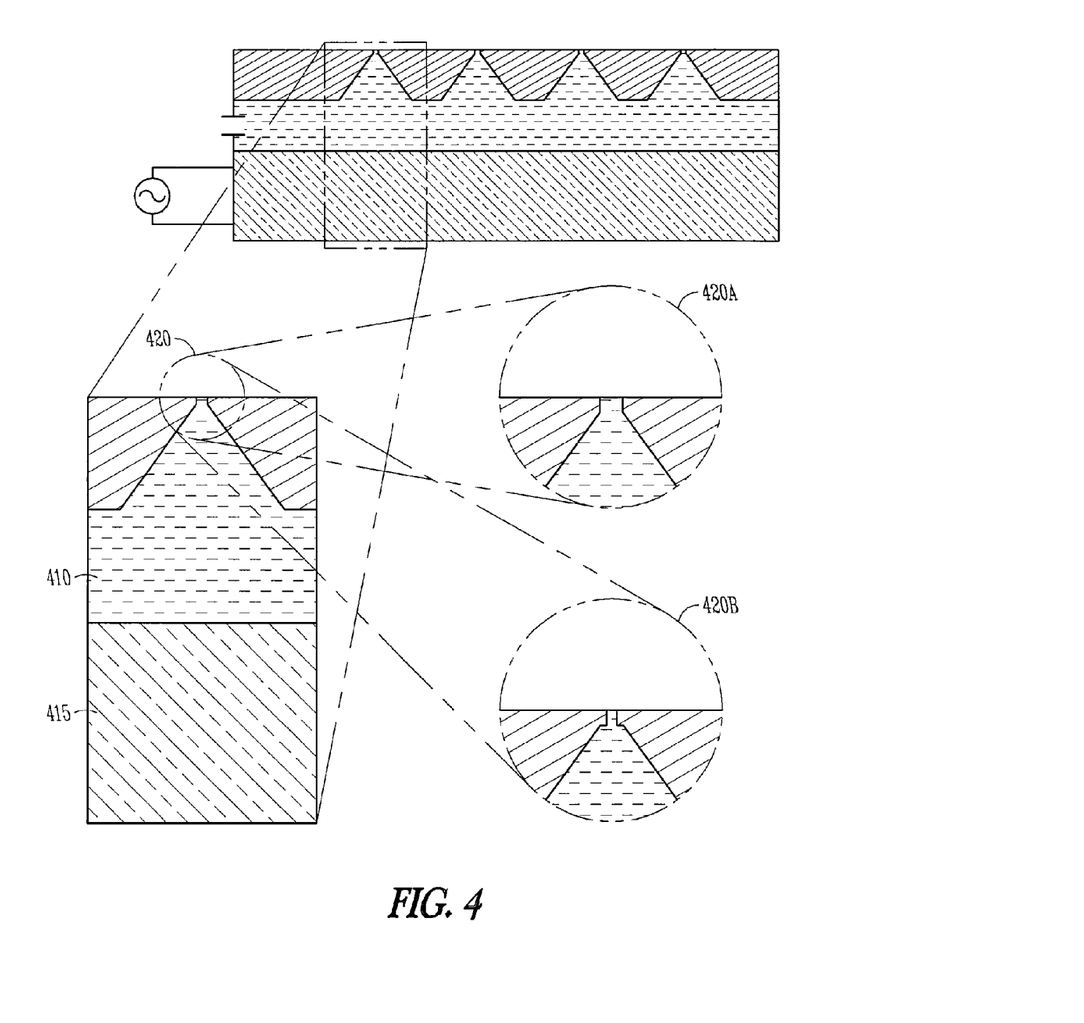
FIG. 4 is a schematic of an ultrasonic atomizer.

The UAE atomizer nozzles are on one side of an array of resonant fluid cavities. The cavity focuses acoustic waves at the nozzles when driven at appropriate resonant frequencies. Modeling the cavity's properties allows the selection of a piezoelectric transducer material and geometry for the most efficient operation in the desired frequency range. This framework is illustrated in the droplet generator depicted in FIG. 4. As shown in FIG. 4, the UAEIL fluid cavity 410 is formed between the piezoelectric transducer 415 and an array of liquid horn structures 420, 420A, and 420B (nozzles) in the cover plate. The wave-focusing horns 420 (or other wave focusing structures) are designed to terminate near the opposite side of the ejector plate via open orifices either created in bulk substrate or in a thin membrane.

The atomizer in FIG. 4 generates liquid droplets by utilizing cavity resonances in the 1-3 MHz range. These frequencies match the acoustic wave focusing properties of liquid horns. The liquid horn structure, cavity size, and the speed of sound within the fluid dictate the device resonances and thus the operating frequencies. Inexpensive and commonly available lead zirconate titanate (PZT-8) ceramic can be used for the piezoelectric transducer. When the piezoelectric transducer is driven at the fundamental cavity resonant frequency or any of the higher cavity modes, a standing acoustic wave develops. The constructive interference in the pyramidal nozzles focuses the wave so that the peak pressure gradient occurs near the tip of the nozzles. The frequency at which this device operates most efficiently is dictated by the fluid chamber resonances for power-efficient operation. The optimum geometry of the UAEIL chamber is modeled and the driving frequency adjusted for optimum IL spraying.

Figure 5A:
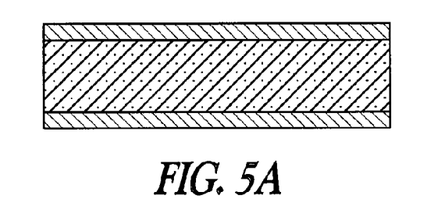
FIGS. 5A-5G illustrate a process for fabricating electrospray nozzle array plates in silicon.
Figure 5B:
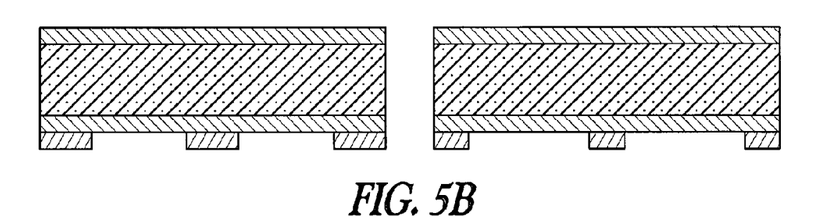
Figure 5C:
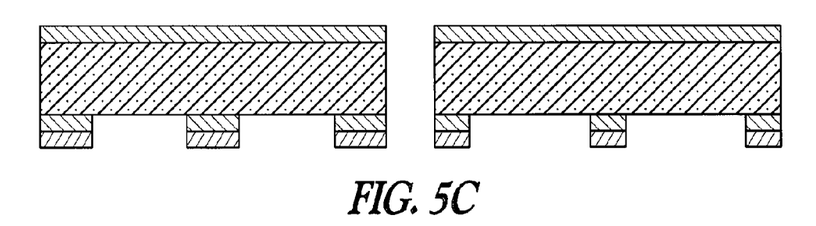
Figure 5D:
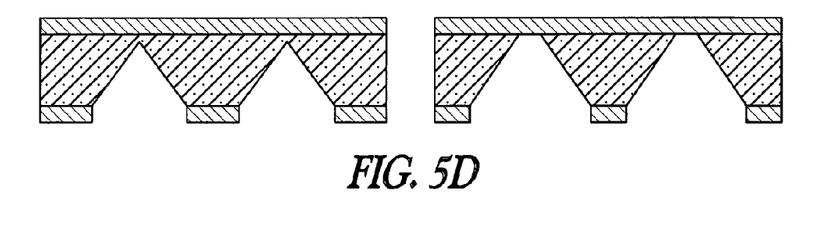
Figure 5E:
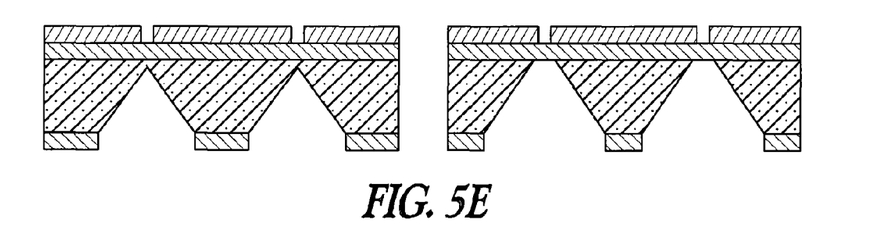
Figure 5F:
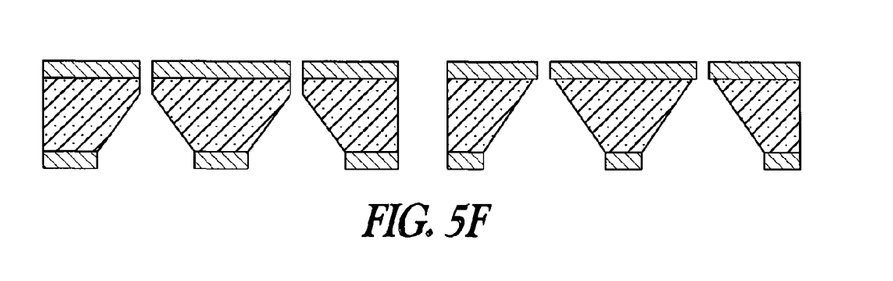
Figure 5G:
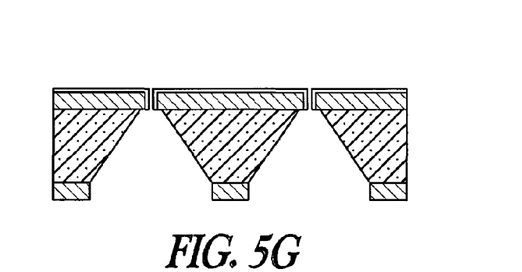

A number of horn shapes are capable of focusing acoustic waves including a pyramidal shape. This shape can be fabricated via a single step potassium hydroxide (KOH) wet etch of [100]-oriented silicon. When square patterns, which have edges aligned to the <110> direction of a [100]-oriented silicon wafer, are opened in a masking layer of silicon nitride (FIGS. 5A, 5B, 5C) and exposed to a solution of KOH, the (100) planes are etched more rapidly than the {111} planes. This yields a pyramidal horn (FIG. 5D) that makes a 54.74° angle with the plane of the wafer. The pyramid base size is designed so that the tip of these focusing pyramidal horns terminates near the opposite surface of the silicon wafer. As the last step of the process, nozzle orifices of a desired diameter (3-50 μm used in the various versions of the device) are formed by dry etching through the remaining silicon or a nitride membrane located at the opposite side of the silicon wafer using either deep reactive ion etching (DRIE) or reactive ion etching (RIE) in an inductively coupled plasma (ICP) machine (FIGS. 5E, 5F, 5G). This simple, highly reproducible, low cost process yields thousands of ejector nozzles on a single silicon wafer.

The uniformity of the ionic liquid plume can be useful in realizing robust long term CC capability. The droplet size variation and volume sprayed should be well characterized to ensure proper $CO_2$ removal during the device lifetime. The fundamentals of ejection mode uniformity are well understood for other liquids. The models described below are translated into a useful form for IL. The paragraph below describes the type of modeling that can be used.

The UAE array can be operated in either drop-on-demand (DOD) or continuous-jet-ejection mode. The scaling analysis suggests that the Weber number (We=$\rho U^2 r_0/\sigma$) and the Strouhal number (St=$fr_0/U$), which is based on the driving frequency f, fluid density $\rho$ and surface tension $\sigma$, droplet radius $r_0$ and ejection velocity U, can be used to predict the transition from continuous jet to discrete-droplet mode of ejection. The critical Weber number Wec must be of the order of the reciprocal of the square of the Strouhal number, $O(1/St^2)$, for transition to occur.

These different modes of operation can accommodate the requirements of a specific task such as droplet-gas contact time, solvent consumption, etc. Careful stroboscopic visualization of the ejection process permits identification of the relationship between the orifice diameter, frequency, and amplitude of the driving AC signal that differentiates these ejection modes. Given the specific transport and physical properties of the fluid ejected and a size of the atomizer nozzle orifices, the scaling relationship between We and St numbers, as described above, allows one to define the operating frequency threshold to achieve the discrete-droplet mode of operation. Regardless of the ejection mode, the produced droplets/jets are highly uniform in size, which can be an important consideration for achieving efficient and reproducible performance of any system relying on the "quality" of fluid dispersion. The quality of the ejection of ILs from the UAE atomizer can be analyzed using a laser diffraction droplet sizing instrument. Specifically, a Malvern Instruments Spraytec laser diffraction droplet sizing instrument can be used to analyze the droplets with a range of orifice sizes (e.g., 3.5, 6 and 7 μm).

Putting a net charge of the same sign is often beneficial in aerosol formation to sustain the quality of the dispersed phase of the liquid by avoiding in-flight coalescence of generated droplets. In an embodiment, the IL plume can be charged by using low bias DC potentials ($V_{ext}$) or in an AC mode of the piezoelectric transducer's operation ($V_{PZT}$) through the intrinsic coupling of electric and mechanic fields in the UAE atomizer. Both options would use a locally arranged set of electrodes in the vicinity of the nozzle array surface. The process exploits the local electrokinetic charge separation in ionic conductors, driven by interfacial Maxwell stresses acting upon an evolving high-curvature droplet interface.

The power efficiency of the UAE sprayers should be high in order to maintain the lowest possible COE. The UAE nozzles are resonant devices designed to exploit matched resonant frequencies of the array of liquid horns and the piezoelectric transducer to enable efficient low-power operation. A pi-matching circuit can be used to more closely match the most active cavity resonances with the natural longitudinal resonance of the piezoelectric transducer. Under these circumstances, the current drawn by the ejector is approximately 37 mA at a voltage of 2.3 $V_{RMS}$ applied across the piezoelectric transducer, resulting in a power consumption of only 85 mW, and which resulted in the stable ejection of approximately 100 mL/min (a function of the number of active nozzles) while maintaining the transducer temperature below 30° C. Incrementally increasing the active number of nozzles driven by a single piezoelectric transducer comes at a significantly diminishing cost (a fraction of a percent) of additional power. Consequently, larger array sizes have improved power utilization. The device also possesses a self-pumping capability enabled by the flexing piezoelectric transducer, thus requiring no additional pump for continuous operation.

A modeling of a UAEIL CC system can use ANSYS to estimate the fraction of the electrical input power to the piezoelectric transducer that is imparted to the ejected fluid. This not only yields the cavity resonance at which the UAE device produces the strongest and most efficient ejection, but also suggests whether or not it is desirable to make the resonance of the piezoelectric transducer coincide with a cavity resonant frequency. The kinetic energy imparted to a single droplet will be estimated from the average acoustic velocity magnitude of all of the fluid elements adjacent to the outlet of each of the nozzles, $KE_d=(½)\rho \forall_d U_d^2$, where $\rho$ is the fluid density, $\forall_d$ is the droplet volume, and $U_d$ is the estimated droplet velocity. The droplet volume $\forall_d$ can be calculated by noting that the droplet radius $r_d$ is approximately equal to the radius $r_o$ of the orifice. Since a droplet is ejected from every nozzle during every cycle, the total power imparted to the fluid is expressed as $P_F=fNKE_d$, where f is the driving frequency of the piezoelectric transducer, and N is the number of nozzles (e.g., equal to 400 for 20×20 array). The electrical input power to the piezoelectric transducer is given by $P_E=VRe(i_p)$, where V is the applied voltage, and $i_p$ is the current flowing through the piezoelectric transducer. The device efficiency will be evaluated as the ratio of the power imparted to the ejected fluid, to the electrical input power to the transducer, at each frequency of operation. These modeling techniques can ensure that the fundamental knowledge base is developed for technology transition from future scale-up of the UAEIL CC system.

Some examples of IL cations and anions are shown in FIG. 2. In an embodiment, the desired properties of an ionic liquid include the $CO_2$ absorption capacity and other physical properties of the ionic liquid IL as a function of tuning the individual cations and anions of the ionic liquid. Such desirable properties can be broadly divided into high $CO_2$ capacity at low absorption enthalpies and optimizing the desire for high $CO_2$ with ideal physical characteristics for low power pumping after $CO_2$ capture. The ideal IL for UAEIL CC requires high $CO_2$ capacity with low heat of absorption, and low viscosity before and after $CO_2$ capture.

This section describes the approach to synthesizing high $CO_2$ capacity ionic liquids. Recent advances in molecular modeling have resulted in a group of ILs with high $CO_2$ capacity. These ILs typically have amine functional groups attached to them. The amine functional group greatly increases acidic gas capture capacity of $CO_2$, in some cases, over 15% (w/w). For example, [$H_2NC_3H_6$mim][$Tf_2N$] ILs absorb ~17% (mol/mol) $CO_2$ at room temperature and 1 bar pressure. The absorption enthalpy of [$H_2NC_3H_6$mim][$Tf_2N$] is −49, which compares very favorably with conventional MEA's −143 kJ/mol.

The $CO_2$ capacity of a particular IL depends on two major factors: chemisorption and physisorption. The first will depend on the nature of the cations and anions comprising the IL while the second will depend, to a large extent, on the free volume (holes) within the IL at a particular temperature. The free volume (holes) associated with each of the proposed ILs can be calculated. This can be accomplished by experimentally determining the molar volume of the IL and then calculating the molecular volume of the particular IL using either Bondi volumes or a built-in component of the Spartan software. Multiplying this calculated volume by Avogadro's number and subtracting this number from the molar volume will result in an approximation of the void volume (holes). Greater void volumes reflect a greater $CO_2$ capacity. The absolute values of the void volumes are not as important as the relative values in providing direction for developing the most efficient IL for $CO_2$ capture.

In addition to the above mentioned modeling effort, the modified separation of cohesive energy density (MOSCED) modeling approach can be taken to better understand $CO_2$-IL interaction and guide optimal IL design. Using the model in Equation 1, several parameters have been successfully regressed for a few ILs in various solvents with an absolute average deviation of 10.6% to experimental literature data.

$$\ln\gamma_2^\infty = \frac{v_2}{RT}\left[(\lambda_1 - \lambda_2)^2 + \frac{q_1^2 q_2^2 (\tau_1 - \tau_2)^2}{\psi_1} + \frac{(\alpha_1 - \alpha_2)(\beta_1 - \beta_2)^2}{\xi_1}\right] + \ln\left(\frac{v_2}{v_1}\right)^{aa} + 1 - \left(\frac{v_2}{v_1}\right)^{aa} \quad \text{Eq. 1}$$

Before the MOSCED modeling approach can be employed, sufficient $CO_2$ solubility data for a wide range of IL solutes is collected. This demands strong support in IL characterization. Differential Scanning calorimetry (DSC) and ThermoGravimetric Analysis (TGA) data will show the capacity as loss of $CO_2$. NMR and IR measurements can also be used to indicate capacity. For even more precise capacity measurements, Attenuated Total Reflectance (ATR) Fourier-transform infrared (FT-IR) spectroscopy can be used. The ATR FT-IR optics bench is a Heated Golden Gate ATR sample accessory supplied by Specac. With this device the specific interaction between the captured $CO_2$ and the IL can be measured.

It is noteworthy that its with strong $CO_2$ absorption, such as [TMGHB$_2$] [TF$_2$S], also demonstrate excellent $SO_x$ and $NO_x$ absorption. The absorbed $SO_2$ is readily released at 140° C. It is interesting to note that repeated $SO_2$ absorption/desorption shows little deterioration of the IL properties, so that it will not degrade CC properties. The outcome of the modeling efforts presented below will also help in understanding if the designed ionic liquids can also be useful for simultaneous removal of $SO_x$ and $NO_x$ from flue gas.

The physical properties of the IL can impact the description temperature and required pumping power. The thermodynamics of the absorption process will determine the desorption temperature and largely affect the energy use and economics. The process involves absorption at a lower temperature, $T_{low}$, followed by heating to a higher temperature, $T_{high}$, for desorption of the $CO_2$ and regeneration of the IL, followed by cooling back to $T_{low}$ to repeat the cycle.

One effect of $CO_2$ capture for amine-derivatized IL is the increase in viscosity. At high $CO_2$ loadings, some amine-derivatized IL's can have viscosities in the range of thousands of cP. This increase in viscosity is an undesirable effect for the disclosed UAEIL process.

However, the addition of small amounts of co-solvent drastically reduces the viscosity of IL. Most relevant to this application, added water decreases the viscosity of IL significantly. The addition of water not only reduces the IL's viscosity, making it more applicable for this process, but it also increases $CO_2$ capture capacity through the formation of carbonic acid. A second method to decrease certain IL viscosity is gas absorption. Interestingly, $CO_2$ decreases the microviscosity of [BMIM][PF$_6$], by a factor of 4 at 35° C. and 50 bar. The final tool toward designing an IL with the desired viscosity is structural modifications of the ions. For example, asymmetric ions lower IL viscosities, and the addition of one silicon atom to a side chain of an imidazolium cation decreased its viscosity by an order of magnitude.

Tailored IL synthesis is usually achieved by derivatizing one or both of the ions of the IL with existing functional groups. IL synthesis is relatively straight forward. In fact, quite a few of them are one-pot reaction. The above mentioned [Choline][pro], for example, is synthesized through a one-step reaction of choline hydroxide and L-proline in modest condition.

An atomization device should be fundamentally capable of ejecting high viscosity fluids, such as IL, at near ambient temperature. Existing devices that target dispersion of highly viscous fluids are mainly print-heads found in applications concerning additive manufacturing. The state-of-the-art are print-heads supplied by MicroFab Technologies (www.microfab.com), Dimatix (www.dimatix.com) and Xaar (www.xaar.co.uk) that eject fluid from arrays of 30-100 μm diameter nozzles and operate at piezoelectric pumping frequencies between 2 and 20 kHz. Fluid surface tension is typically between 0.02 and 0.05 N/m and the print-head and ejected fluid are heated to lower the viscosity to below 40 mN-s/m² to be able to achieve an ejection.

Figure 7:
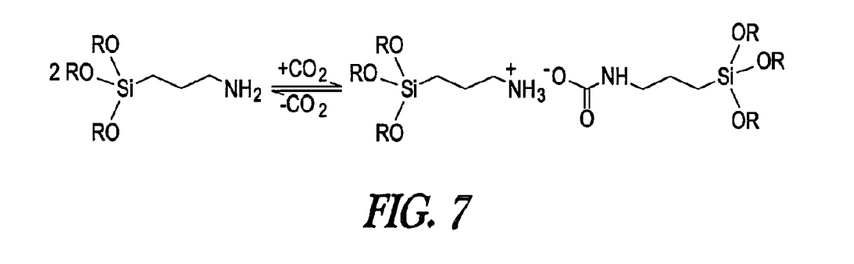
FIG. 7 is an equation illustrating the absorption of carbon dioxide by an ionic liquid.

In an embodiment, a one-component, thermally reversible IL derived from siloxylated amines can be designed, synthesized, and characterized. (See e.g. FIG. 7). In this effort, molecular precursors (silylated amines) are reacted with $CO_2$ by bubbling through these liquids at room temperature until completion of the exothermic reaction. This reaction proceeds within minutes. A Specac, Ltd. heated "Golden Gate" ATR accessory with diamond crystal and ZnSe focusing lenses can be used in combination with a custom-made high pressure reactor. The FT-IR absorbance measurements can be collected with a Shimadzu IRPrestige21 using a DLATGS detector, with 32 scans and a resolution of 1 cm$^{-1}$. The ILs were prepared ex situ and transferred to the reaction chamber, which was heated to 35° C. The $CO_2$ was introduced via an ISCO syringe pump at a pressure of 61.5 bar, and the ATR FT-IR spectra were recorded after the system had reached equilibrium. The $CO_2$ sorption and swelling were calculated. It was observed that up to 20 moles of $CO_2$ is captured per 1 kg of such ILs under the experimental conditions. This equates to 46.8% w/w $CO_2$ capture. Although for the proposed UAEIL effort, the $CO_2$ partial pressure is much lower, this class of IL certainly is one important leads for the optimal IL design.

Ionic liquids can have a greater than 0.5 capacity for $CO_2$, suggesting both physical and chemical adsorption take place. In an embodiment, the ionic liquids are augmented with a co-solvent to lessen the viscosity of the $CO_2$-IL complex. With that mitigation, the active ionic liquid absorber will still be at high concentration, larger than the 20-30% that is associated MEA solutions. In another embodiment, the ionic liquids have absorption capacities of 0.4 (mol/mol). When met, this capacity would be between 4 and 2.6 times greater than most MEA solutions. This improvement results in requiring less liquid to capture the same amount of $CO_2$. At the designed capacity, the scaled-up the UAEIL CC system would require spraying no more than 56 m$^3$/min of the IL.

Within an AMUSE device, the input energy is a strong function of the size piezoelectric transducer. At optimized fluidic geometries, the current 1 in$^2$ transducer would require <5 W of power to spray an IL. Scaling to the 40,000 devices (required under the worst case scenario above) would require 0.2 MW. This represents a parasitic power demand of less than 0.04% for a 550 MW plant (LCOE increase in mills/kWe is negligible). Assuming the 25% reduction from above and the 0.2 MW increase needed to spray the IL results in an energy savings of approximately 6 MW over the current amine system auxiliary (MEA CCS uses 23.5 MW). If the lower Amine system auxiliary load corresponds to similar decreases in the other common auxiliary loads, a 25% reduction in additional fuel costs could be achieved while using the UAEIL CC system (a reduction of 2.5 mills/kWe in the LCOE).

Figure 6A:
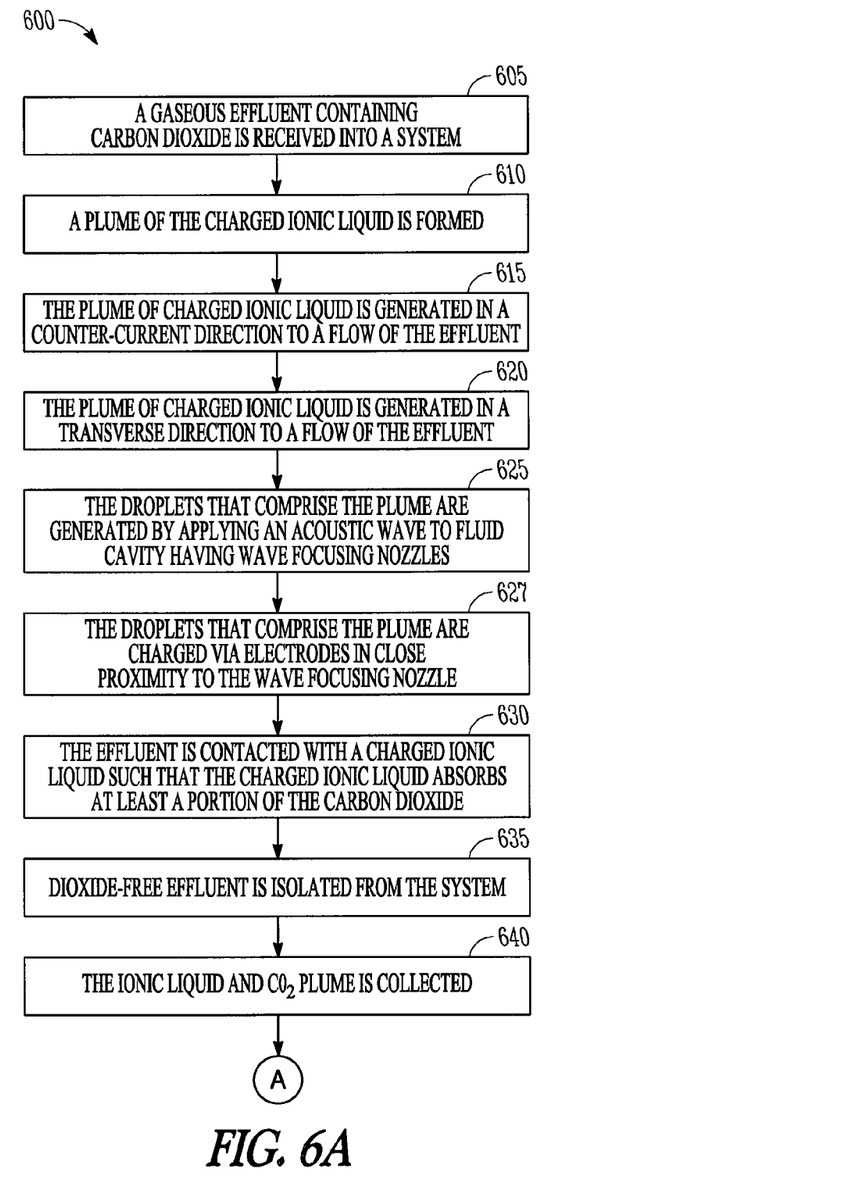
FIGS. 6A and 6B are a flowchart of an example process to remove carbon dioxide from an effluent.
Figure 6B:
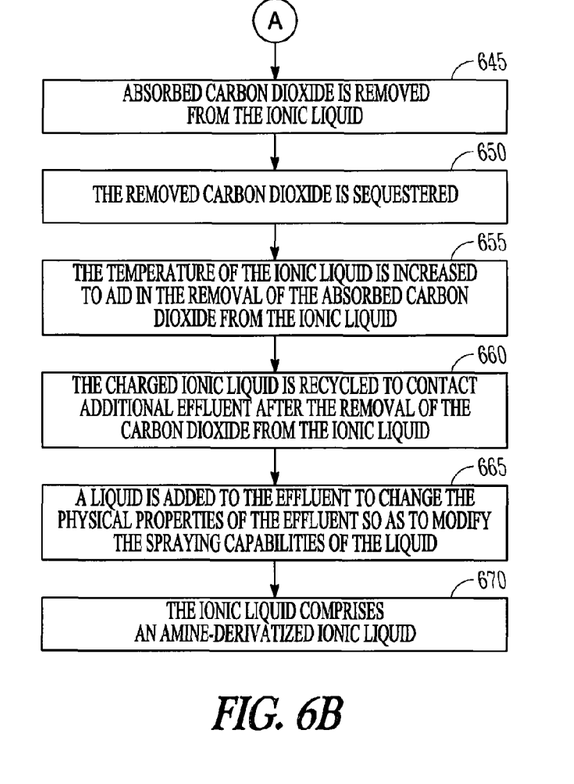

FIGS. 6A and 6B are a flowchart of an example process 600 for removing carbon dioxide from an effluent. FIGS. 6A and 6B include a number of process blocks 605-670. Though arranged serially in the example of FIGS. 6A and 6B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 6A and 6B, at 605, a gaseous effluent containing carbon dioxide is received into a system. At 610, a plume of a charged ionic liquid is formed. In an embodiment, the plume comprises droplets having a diameter of less than 1,000 micrometers. At 615, the plume of charged ionic liquid is generated in a counter-current direction to a flow of the effluent, and at 620, the plume of charged ionic liquid is generated in a transverse direction to a flow of the effluent. At 625, the droplets that comprise the plume are generated by applying an acoustic wave to a fluid cavity having wave focusing nozzles. At 627, the droplets that comprise the plume are charged via electrodes in close proximity to the wave focusing nozzle. At 630, the effluent is contacted with a charged ionic liquid such that the charged ionic liquid absorbs at least a portion of the carbon dioxide. At 635, carbon dioxide-free effluent is isolated from the system. At 640, the IL and $CO_2$ plume is collected. At 645, the absorbed carbon dioxide is removed from the charged ionic liquid.

At 650, the removed carbon dioxide is sequestered. At 655, the temperature of the ionic liquid is increased to aid in the removal of the absorbed carbon dioxide from the charged ionic liquid. At 660, the charged ionic liquid is recycled to contact additional effluent after the removal of the carbon dioxide from the charged ionic liquid. At 665, a liquid is added to the effluent to change the physical properties of the effluent so as to modify the spraying capabilities of the liquid. At 670, the charged ionic liquid comprises an amine-derivatized ionic liquid.

EXAMPLE EMBODIMENTS

In Example No. 1, a process includes receiving a gaseous effluent containing carbon dioxide, contacting the effluent with a charged ionic liquid such that the charged ionic liquid absorbs at least a portion of the carbon dioxide, and removing the absorbed carbon dioxide from the charged ionic liquid.

In Example No. 2, a process includes the features of Example No. 1, and further optionally includes sequestering the removed carbon dioxide.

In Example No. 3, a process includes the features of Example Nos. 1-2, and further optionally includes forming a plume of the charged ionic liquid, the plume comprising droplets having a diameter of less than 1,000 micrometers.

In Example No. 4, a process includes the features of Example Nos. 1-3, and further optionally includes generating the plume of charged ionic liquid in a counter-current direction to a flow of the effluent.

In Example No. 5, a process includes the features of Example Nos. 1-4, and further optionally includes generating the plume of charged ionic liquid in a transverse direction to a flow of the effluent.

In Example No. 6, a process includes the features of Example Nos. 1-5, and further optionally includes a process wherein the droplets that comprise the plume are generated by applying an acoustic wave to fluid cavity having wave focusing nozzles.

In Example No. 7, a process includes the features of Example Nos. 1-6, and further optionally includes isolating carbon dioxide-free effluent.

In Example No. 8, a process includes the features of Example Nos. 1-7, and further optionally includes increasing the temperature of the ionic liquid to aid in the removal of the absorbed carbon dioxide from the ionic liquid.

In Example No. 9, a process includes the features of Example Nos. 1-8, and further optionally includes recycling the ionic liquid to contact additional effluent after the removal of the carbon dioxide from the ionic liquid.

In Example No. 10, a process includes the features of Example Nos. 1-9, and further optionally includes adding a liquid to the effluent to change the physical properties of the effluent so as to modify the spraying capabilities of the liquid.

In Example No. 11, a process includes the features of Example Nos. 1-10, and further optionally includes a process wherein the ionic liquid comprises an amine-derivatized ionic liquid.

In Example No. 12, a system includes an ultrasound wave generator, a fluid cavity coupled to the ultrasound wave generator, an array of micro-machined ultrasonic-assisted electrospray nozzles coupled to the fluid cavity, an electrode configured to impart a charge onto the fluid output of the nozzles and a carbon dioxide release unit configured to receive the ionic liquid after absorption of carbon dioxide by the ionic liquid and to remove carbon dioxide from the liquid.

In Example No. 13, a system includes the features of Example No. 12, and further optionally includes a carbon dioxide sequestration unit configured to receive the removed carbon dioxide.

In Example No. 14, a system includes the features of Example No. 12-13, and further optionally includes a system wherein the wave generator comprises a piezoelectric transducer.

In Example No. 15, a system includes the features of Example Nos. 12-14, and further optionally includes a system wherein the electrospray nozzles are shaped to allow constructive interference or focusing of the ultrasonic waves.

In Example No. 16, a system includes the features of Example Nos. 12-15, and further optionally includes a system wherein the electrospray nozzles comprise an array of nozzles in a silicon substrate, and wherein each nozzle comprises an opening in a range of 3-50 µm.

In Example No. 17, a system includes the features of Example Nos. 12-16, and further optionally includes a system wherein the ionic liquid comprises an amine-derivatized ionic liquid.

In Example No. 18, a tangible non-transitory machine readable storage medium comprising instructions that when executed by a processor execute a process comprising receiving a gaseous effluent containing carbon dioxide, contacting the effluent with a charged ionic liquid such that the charged ionic liquid absorbs at least a portion of the carbon dioxide, and removing the absorbed carbon dioxide from the ionic liquid.

In Example No. 19, the machine readable medium includes the features of Example No. 18, and further optionally includes instructions for forming a plume of the charged ionic liquid, the plume comprising droplets having a diameter of less than 1,000 micrometers.

In Example No. 20, the machine readable medium includes the features of Example Nos. 18-19, and further optionally includes instructions for generating the droplets that comprise the plume by applying an acoustic wave to fluid cavity having wave focusing nozzles.

Thus, an example system and method for ultrasound-assisted electrospray ionic liquid for carbon dioxide capture have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process comprising:
   receiving a gaseous effluent containing carbon dioxide;
   forming a plume of a charged ionic liquid, the plume comprising droplets having a diameter of less than 1,000 micrometers;
   generating the plume of charged ionic liquid in a counter-current direction to a flow of the effluent;
   contacting the effluent with the charged ionic liquid such that the charged ionic liquid absorbs at least a portion of the carbon dioxide; and
   removing the absorbed carbon dioxide from the charged ionic liquid.

2. The process of claim 1, comprising sequestering the removed carbon dioxide.

3. The process of claim 1, comprising generating the plume of charged ionic liquid in a transverse direction to a flow of the effluent.

4. The process of claim 1, wherein the droplets that comprise the plume are generated by applying an acoustic wave to fluid cavity having wave focusing nozzles.

5. The process of claim 1, comprising isolating carbon dioxide-free effluent.

6. The process of claim 1, comprising increasing the temperature of the ionic liquid to aid in the removal of the absorbed carbon dioxide from the ionic liquid.

7. The process of claim 1, comprising recycling the ionic liquid to contact additional effluent after the removal of the carbon dioxide from the ionic liquid.

8. The process of claim 1, comprising adding a liquid to the effluent to change the physical properties of the effluent so as to modify the spraying capabilities of the liquid.

9. The process of claim 1, wherein the ionic liquid comprises an amine-derivatized ionic liquid.

10. The process of claim 1, wherein the charged ionic liquid comprises one or more of imidazolium, tetra alkylammonium, pyrrolidinium, pyridinium, and tetra alkylphosphonium.

11. The process of claim 1, comprising generating the charged ionic liquid using an Array of Micromachined Ultra-Sonic Electrospray (AMUSE) nozzles.

* * * * *